United States Patent
Naick et al.

(10) Patent No.: US 7,409,425 B2
(45) Date of Patent: Aug. 5, 2008

(54) SELECTIVE TRANSMISSION OF AN EMAIL ATTACHMENT

(75) Inventors: Indran Naick, Cedar Park, TX (US); Jeffrey Kenneth Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 793 days.

(21) Appl. No.: 10/713,735

(22) Filed: Nov. 13, 2003

(65) Prior Publication Data
US 2005/0108335 A1  May 19, 2005

(51) Int. Cl.
*G06F 15/16* (2006.01)
(52) U.S. Cl. ........................ 709/206; 709/203; 709/219; 709/229
(58) Field of Classification Search ................ 709/206, 709/203, 219, 229
See application file for complete search history.

(56) References Cited

U.S. PATENT DOCUMENTS

| 5,903,723 A | * | 5/1999 | Beck et al. ................... 709/205 |
| 6,327,612 B1 | | 12/2001 | Watanabe |
| 7,054,905 B1 | * | 5/2006 | Hanna et al. ................. 709/206 |
| 2003/0084106 A1 | * | 5/2003 | Erev et al. .................... 709/206 |
| 2003/0200267 A1 | * | 10/2003 | Garrigues .................... 709/206 |

* cited by examiner

*Primary Examiner*—Phuoc H Nguyen
(74) *Attorney, Agent, or Firm*—Herman Rodriguez; Shubert Osterrieder & Nickelson PLLC (57) ABSTRACT

Methods, devices, systems, and media are disclosed for replacing an email attachment with a call, and forwarding the email with the call to a user for selective display of the attachment by making a call. One embodiment includes receiving an email on a mail server, wherein the email has the email attachment, and removing the email attachment from the email to produce a stripped email. The embodiment further includes storing the email attachment on a server, adding the call to the stripped email, and forwarding the stripped email with the call for displaying to a recipient.

7 Claims, 4 Drawing Sheets

SELECTIVE TRANSMISSION OF AN EMAIL ATTACHMENT

CROSS-REFERENCES TO RELATED APPLICATIONS

Pursuant to 35 USC § 119(e), this application claims priority to and benefit of U.S. patent application Ser. No. 10/713,739, entitled "PRIVATE EMAIL CONTENT", filed on the same day, the disclosure of which is incorporated herein in its entirety for all purposes.

Pursuant to 35 USC § 119(e), this application claims priority to and benefit of U.S. patent application Ser. No. 10/713,736, entitled "OPTIONAL RECEIPT OF AN EMAIL ATTACHMENT", filed on the same day, the disclosure of which is incorporated herein in its entirety for all purposes.

FIELD OF INVENTION

The invention generally relates to selective transmission of an email attachment. More particularly, the invention relates to methods, devices, systems, and media for replacing an email attachment on an email with a call, and forwarding the email with the call to the email recipient. The email recipients may then selectively retrieve the email attachment via the call.

BACKGROUND

Electronic mail ("email") is an electronic message, which a user types at a computer system, and then transmits over a computer network to another user. For a user to type an email, the computer system includes an email client ("client"), which is an application used to read, write and send email. In simple terms, the client is the user interface for an electronic messaging system.

Typically, the email client includes a simple text editor, an address book, a filing cabinet and a communications module. The text editor allows the user to compose a text message for an email, and usually includes spell and grammar checking as well as formatting facilities. The text editor may also include the ability to append attachments to an email such as files, documents, executable programs, schematics, etc. The address book stores commonly used email addresses in a convenient format to reduce the chance of email address errors. The filing cabinet stores email messages, both sent and received, and usually includes a search function for easy retrieval of a desired email or email attachment. The communications module deals with transport to and from the email client over a computer network to a mail server, the application that receives an email from email clients and/or other mail servers.

An organization's computer network consists of a number of computer systems interconnected with links for transmission of data between the computer systems, which serve as conduits to send an email to a recipient. In addition to handling email traffic, with or without email attachments, it is noteworthy to point out that these computer systems also handle the everyday rigors of an organization's use, including, for example, storing and retrieving documents, running multiple applications and operating systems, and so forth. The physical design of each link limits the bandwidth for the link. Bandwidth refers to the amount of data that can be transmitted in a fixed amount of time. The topology of the network, i.e., the organization, number, and interconnection between links of the network, can be designed to increase bandwidth between different points on the network by providing parallel links. Therefore, design of the bandwidth and topology for these networks must take into consideration all traffic, finding a balance between the costs involved with increasing bandwidths of links and the slow downs when the bandwidths are less than the peak traffic requirements.

Compromising the network's capacity more so is the handling of email traffic when the emails include email attachments. Email attachments can cause the traffic bandwidth requirements to peak, slowing down the network for everyday operations. For example, a user may draft a text email, which is about 20 kilobytes, and transmit the email to ten people. As a result, the mail server introduces 200 kilobytes of data to the network when the mail server generates a copy of the email for each of the ten recipients. Even small networks are likely able handle 200 kilobytes without any noticeable slow downs. However, the user may decide to transmit a drawing, which may be somewhere between 2 megabytes and 20 megabytes, along with the text of the email to enhance the communication. Now, the mail server copies not only the email, but also the email attachment and introduces between 22 megabytes and 202 megabytes of data traffic at substantially the same time, peaking the load, at least in certain links, of even large networks. This makes the network run slower for other users. More troublesome, however, is that many times, emails are sent with email attachments to multiple recipients and many of these recipients may not need or even want the email attachments.

Prior solutions to alleviate email traffic congestion rely on the old solution of "throwing more money at the problem." That is, to solve the congestion problem by increasing the size of the network by increasing the network's bandwidth. In order to display, store, and retrieve data, the network must have computer systems such as dedicated mail servers of sufficient size to accommodate the data traffic requirements. Therefore, increasing a network's bandwidth necessarily requires an organization to make greater expenditures or institute restrictions on use of the network's computer systems to keep pace with the increased demands. These types of solutions, however, are piecemeal solutions that will forever require greater expenditures or restrictions as an organization grows. In short, these solutions are not solutions; they are patches for network problems.

It is apparent that there is a need for devices, methods, systems, and media for selective display of an email attachment that overcomes these problems, and specifically attenuates or eliminates the need for increasing a network's size or instituting restrictions on network use by reducing or at least time-shifting transmission of email attachments.

SUMMARY OF THE INVENTION

Embodiments of the invention generally provide methods, systems, and media for replacing an email attachment with a call, and forwarding the email with the call to a user for selective transmission of the attachment by making a call. In one embodiment, the method generally includes removing the email attachment from the email, thereby producing a stripped email; storing the email attachment; adding the call to the stripped email, wherein the call is configured to retrieve the email attachment upon activation by a recipient of the stripped email; and forwarding the stripped email with the call to the recipient.

In another embodiment, the invention provides a device for replacing an email attachment with a call. The device may include a detacher to remove the email attachment from the email to create a stripped email; storage coupled with the detacher to store the email attachment; and a call incorporator to add the call to the stripped email based upon the storage, the call being configured to retrieve the email attachment upon activation by a recipient of the stripped email.

In yet another embodiment, the invention provides a machine-accessible medium containing instructions, which when executed by a machine, cause the machine to perform operations. The operations generally include receiving an email with the email attachment; removing the email attachment from the email, thereby producing a stripped email; storing the email attachment; adding the call to the stripped email, wherein the call is configured to retrieve the email attachment upon activation; and forwarding the stripped email with the call to a recipient.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling Within the spirit and scope of the present invention as defined by the appended claims. The detailed descriptions below are designed to make such embodiments obvious to a person of ordinary skill in the art.

Generally speaking, systems, devices, methods, and media for replacing an email attachment with a call for later, selective retrieval of the attachment are contemplated. Embodiments include computer systems interconnected to form a network, wherein each computer system further includes an email client constituting a front-end software application enabling a user to generate and receive emails with and without attachments. In communication with the computer network is a mail server consisting of a storage area, a set of user-definable rules, a list of users, and a series of communication modules. The storage area, e.g., a database, stores email for local users, temporarily stores email in transit to another destination, and can store email attachments separated from emails. The user-defined rules, enabled by software, determine how the mail server should react to a variety of issues, including, for example, the destination of a specific email, whether to bar specific email addresses or restrict certain users to only sending email within the company, whether to strip email attachments from emails to produce a stripped email, whether to add a call to a stripped email before forwarding the email to the intended recipient, whether and where to store an email attachment stripped from an email, and so on. The list of users is a database of user accounts that the mail server recognizes and will deal with locally. The communications modules, e.g., modems and routers, are the components that actually handle the transfer of email to and from other mail servers and email clients outside of the local network.

After a user composes an email, attaches one or more email attachments, and forwards the email to a mail server, the mail server may include software and hardware to strip the email attachments from the email, store the email attachments in an accessible storage such as a local hard drive, add a call to the stripped email for all the attachments and/or one for each attachment, and forward the stripped email with the call(s) to one or more recipients. The call(s) maybe, e.g., hyperlinks configured to retrieve the email attachment(s) upon activation by the recipients. Thus, the recipients can decide when and if they want to receive one or more of the attachments and just click on the hyperlink to begin transmission, advantageously reducing data either traffic resulting from email attachments in general or reducing instantaneous data traffic that typically results from sending an email with an attachment to multiple recipients.

In some embodiments, the call may include code such as JAVA™, designed to execute within an email program or a web browser when a recipient either downloads the email with the call or opens the email. In further embodiments, security is added to retrieval of the attachments by authenticating a request for transmission of an email attachment when a recipient activates the call.

Figure 1:
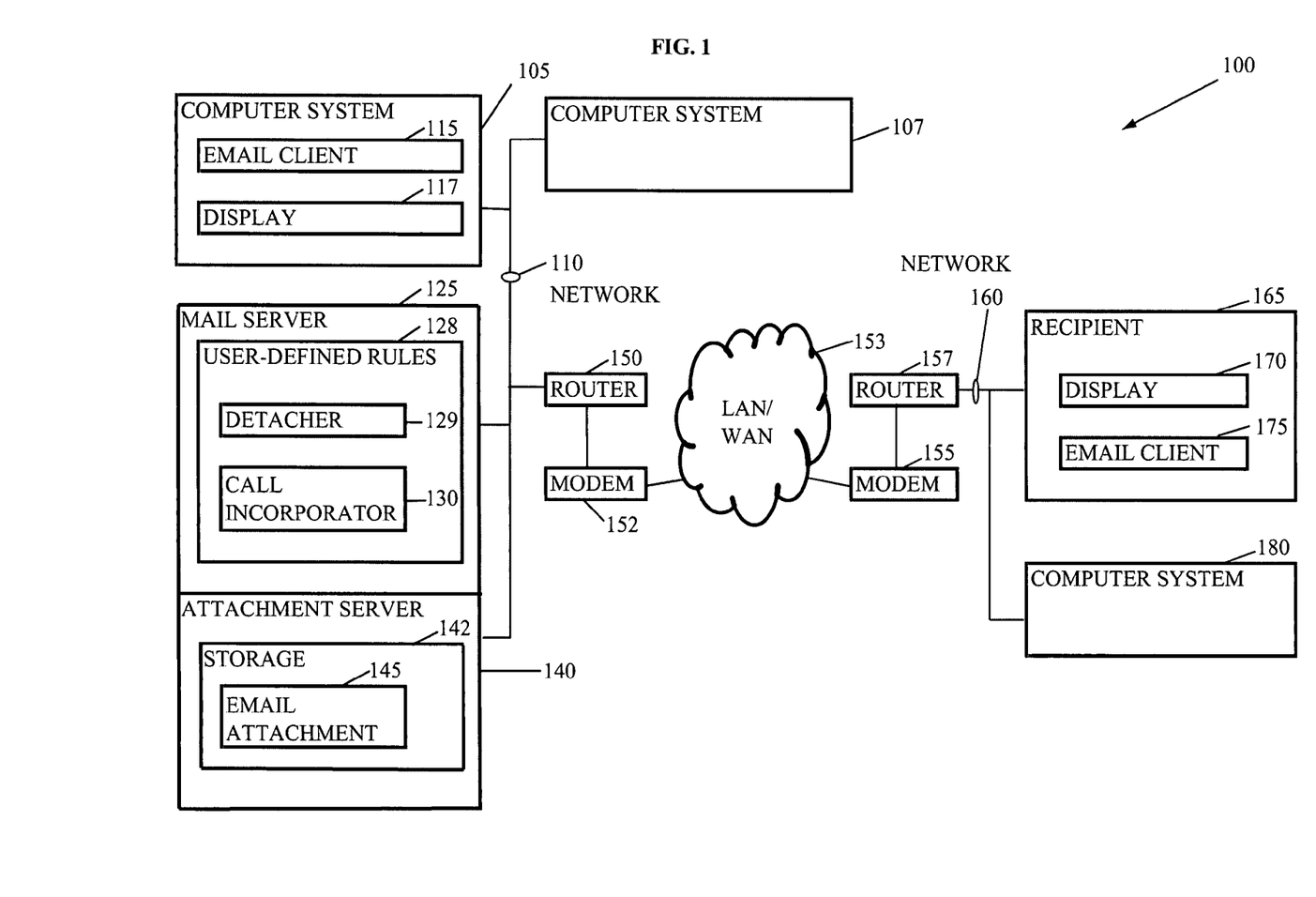
FIG. 1 depicts a system including a mail server and a recipient for replacing an email attachment on an email destined for the recipient with a call and forwarding the email with the call to the recipient.

Turning now to the drawings, FIG. 1 depicts an embodiment of a system 100 for replacing an email attachment with a call, storing the email attachment, and permitting selective retrieval of the email attachment by a user. System 100 depicts more than one computer system 105 and 107 linked together to form a network 110. Computer systems 105 and 107 normally include a keyboard, monitor, mouse, microprocessor, memory, and peripherals, such as printers, CD-ROM devices, and modems. Regarding the network 110, the depicted network 110, for example, is a local-area network ("LAN") with a bus topology, but in other embodiments the type and topology of the network 110 may vary. For example, the network 110 may have a star or ring topology. In addition, the location of the computer systems 105 and 107 may be geographically close together to form a LAN, such as a campus-area network ("CAN") or home-area network ("HAN"), or the computer systems 105 and 107 may be farther apart to form a wide area network ("WAN"), such as a metropolitan-area network ("MAN").

In addition to the type of network and topology, the network 110 has a protocol, which is a common set of rules and signals that the computer systems 105 and 107 use to communicate via the network 110. Examples of possible protocols for the network 110 include Ethernet and IBM's token-ring network. The Ethernet protocol may implement a star or bus topology that supports data transfer rates of 10 Mbps or higher. For IBM's token-ring network, all the computer systems 105 and 107 are arranged in a circle, and a token, which is a special bit pattern, travels around the circle. To send a message, a computer system 105 in the network 110 catches the token, attaches a message to it, and then travels around the network 110 to the destination such as computer system 105. Regardless of the chosen protocol for a network, these choices should be understood to merely represent different embodiments of the invention.

Figure 2:
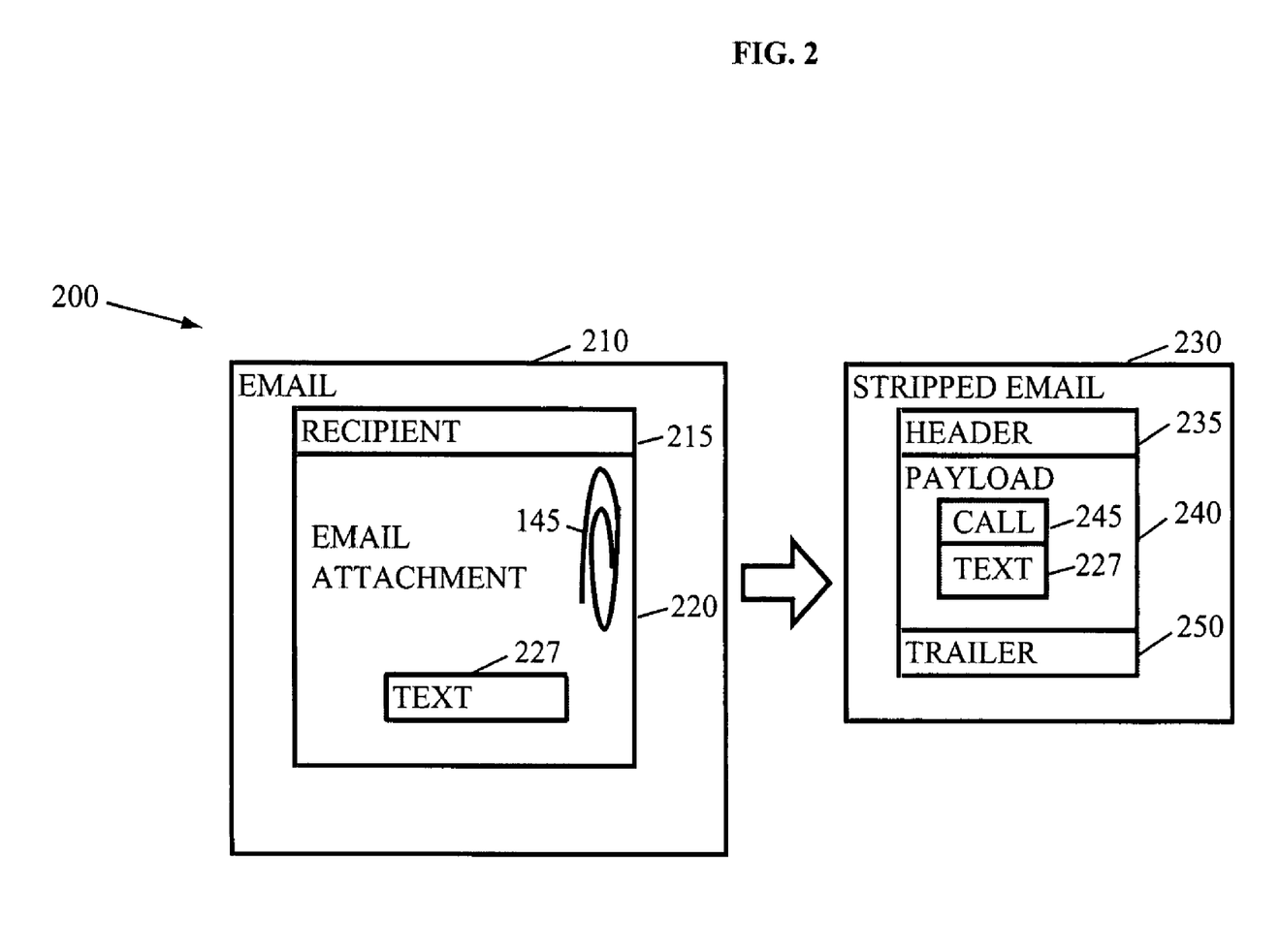
FIG. 2 depicts an example of an email generated by a user in the system of FIG. 1 and the resulting, stripped email to forward to the recipient.

Returning to FIG. 1, typically, a computer system 105 includes an email client ("client") 115, for the user to compose, send and receive email over the network 110. The client 115, itself, is a software application, such as Outlook Express™, Netscape Messenger™, Microsoft Outlook™, Entourage X™, and Eudora™. The client 115, usually includes an intuitive, graphical user interface ("GUI"), a simple text editor that allows the user to create an email 120 simply by typing it in, and functionality to attach and detach documents, diagrams, executables, and so on (collectively, "email attachments") to an email. In addition, the client 115 may include simple spell checking and formatting facilities. FIG. 2 depicts an example of an email 210 as having "email attachments" 145 by depiction of a paperclip icon on email 210. After generation of an email 210 with an email attachment 145, the user chooses a menu option on the client 115 to send/receive email 220.

After sending email 210, email 210 travels over the network 110 to a mail server 125. Mail server 125 may include a computer system like computer system 105, but differs from the other computer systems coupled with network 110 due to installation of mail server software having functions and uses specifically designed to facilitate transmission of email. In particular, mail server 125 often includes user-definable rules 128 and applications for handling and processing of email received from email clients or other mail servers.

After mail server 125 receives email 210, system 100 follows one of the user-defined rules 128, enabled by software, detacher 129 to remove the email attachment 145 from the email 210 to create or render a "stripped" email 230. At this point, system 100 follows another of the user-defined rules 128, also enabled by software, call incorporator 130 to add a call 245 to the stripped email 230. Call 245 on stripped email 230 takes the form of an icon, text, or other graphic associated with a hyperlink, to allow the recipient 165 of the stripped email 230 to optionally retrieve the email attachment 145.

In order to optionally retrieve the email attachment 145, email attachment 145 may be stored on the mail server 125 in storage 142. Storage 142 may be allocated for storing email attachments in general and may include, for example, a database in non-volatile memory such as a hard drive. In addition to a general storage area, mail server 125 may follow still another user-defined rule 128 to partition storage 142 to form a storage area solely for email attachment 145. In other embodiments, email attachment 145 may be stored on any computer system or server responsive to activation of call 245 to transmit email attachment 145 to the corresponding recipient 165.

For the stripped email 230 with the call 245 to leave the mail server 125 to reach the intended recipient 165, the system 100 uses a router 150 in combination with a modem 152 communicate with another LAN/WAN 153 to make a call to a second modem 155, where a second router 157 forwards the stripped email 230 to the intended recipient 165 on a second network 160. Notably, if the intended recipient of the stripped email 230 is on the same network as the sender, then only the router 150 is used.

LAN/WAN 153 is a network connection to couple network 110 with network 160, allowing computer system 105 to send an email 210 to recipient 165 and allowing recipient 165 to retrieve email attachment 145 upon activation of call 245. In some embodiments, LAN/WAN 153 may include a network in an office coupled via Ethernet, optical media like OptiConnect, or the like. In several embodiments, LAN/WAN 153 also couples with the Internet via a cable modem, a direct subscriber line (DSL), a T1 line, a T3 line, or the like. In further embodiments, LAN/WAN 153 may include a network of temporary connections such as connections via a telephone system.

After stripping email attachment 145 from email 210, email 210 is broken down, or separated, into packets, which are byte-sized components of the email 210 disassembled for handling purposes. Router 150 reads one or more of these packets to determine how to route stripped email 230 to the intended recipient 165. Emails, for instance, may be split into three parts, namely a header 235, a payload 240, and a trailer 250. Header 235 may include, e.g., the email sender's and the email receiver's address. Payload 240 may contain the email data, such as the text 227 of the email 210 and call 245. The trailer 250 may contain data to show the end of the packet transmission. Upon parsing header 235 to determine the recipient's email address, router 150 may determine whether stripped email 230 should be routed to modem 152 or to a computer system like computer system 107 on network 110.

The intended recipient 165 receives the stripped email 130 with call 245 much in the same way the sender sent the email 210 with the email attachment 145. That is, receipt is through router 155 and network 160 associated with the recipient 165. For display of the stripped email 230, the recipient uses an email client 175 installed on recipient 165.

Call 245 may be displayed, for instance, as a symbolic link such as an icon with a hyperlink and the recipient may optionally activate call 245 by, for example, clicking on the symbolic link. Call 245 may include instructions to retrieve the email attachment 145 stored in storage 142 on the sender's mail server 125. In some embodiments, call 245 may include an address such as an Internet Protocol (IP) address for mail server 125 as well as instructions for mail server 125 that identify the email attachment and/or the location of the email attachment in storage 142. For example, activating call 135 may transmit a first message to mail server 125, instructing mail server 125 to transmit email attachment 145 from storage 142 to recipient 165. The first message may initiate a web browser on the recipient 165 and direct the web browser to an IP address that is associated with the email attachment 145 on mail server 125. Mail server 125 may respond by authenticating the request to download email attachment 145. Authentication can involve prompting the user for a password and/or comparing the email address associated with the request with the email address associated with the recipient. In several embodiments, authentication may also involve verifying that call 245 was sent to recipient 165 and that recipient 165 has not previously downloaded the attachment. Upon authenticating the request, the attachment may be downloaded to recipient 165 via web browser. Alternatively, a connection such as an instant messaging connection may be established between email client 175 and attachment server 140 via the email address associated with recipient 165 to download email attachment 145 to recipient 165.

In further embodiments, the address may describe an address for an attachment server 140, such as an attachment server created within mail server 125 by a process such as partitioning. For example, an attachment server may be created within mail server 125 and associated with a unique IP address that is also embedded in call 245. Upon activation of call 245, recipient 165 may transmit a message to attachment server 140, which activates software that is responsive to the message. The software, such as a common gateway interface (CGI) application may then transmit email attachment 145 to recipient 165, or authenticate recipient 165 and then transmit email attachment 145 to recipient 165.

As an alternative to the above-described system 100 shown in FIG. 1, the mail server 125 may not be part of the network 110. Instead, the network 110 may link directly to a remote server through a modem. As a further alternative, the mail server 125 may employ the assistance of Web Services for stripping a received email 210 of its email attachment 145, adding a call 245 to the stripped email 230, and storing the email attachment 145 in storage on the remote server for recalling at a later time. Web Services obviate the need for applications to reside in a library as an accessible part of the network 110. Rather, Web Services provide a programming approach for utilizing software on servers scattered across the Internet and reachable by the network 110 when the applications are needed.

In the system 100, Web Services, such as service-oriented architecture protocol (SOAP), may be employed to find service providers that will strip a received email 210 of its email attachment 145, to add a call 245 to the stripped email 230, and to store the email attachment 145 in storage on the remote server for calling. Based on open standards, Web Services have defined core protocols, query language, interfaces, and specifications, all of which increase Web Services' probability for easy integration into the system 100.

Recipient 165 may include a computer system similar to computer system 105 having an email client 175 adapted to retrieve emails from a mail server like mail server 125, and to display the emails to a user via display 170. Recipient 170 may also include a web browser such as Microsoft Internet Explorer™ to facilitate receipt of email attachments upon activation of calls. In many embodiments, users may select and adapt any computer system having an email reader or other email program to be recipient 165.

Turning now to FIG. 2, an example embodiment of a mail server 300 for replacing an email attachment 354 with a call is disclosed. The mail server 300 may receive an email 305 having an email attachment 354. In order to receive email 305 with an email attachment 354, likely generated by a user via an email client such as Outlook™ or Eudora™, the mail server 300 is in communication with a network. The network parses email 305 into packets for transmission purposes along the network. In order to send or receive the email 305 outside of the network, the network may access, e.g., a gateway to contact the distant network, whether that network is the Internet, a series of networks connecting to each other, or a network in close proximity.

Figure 3:
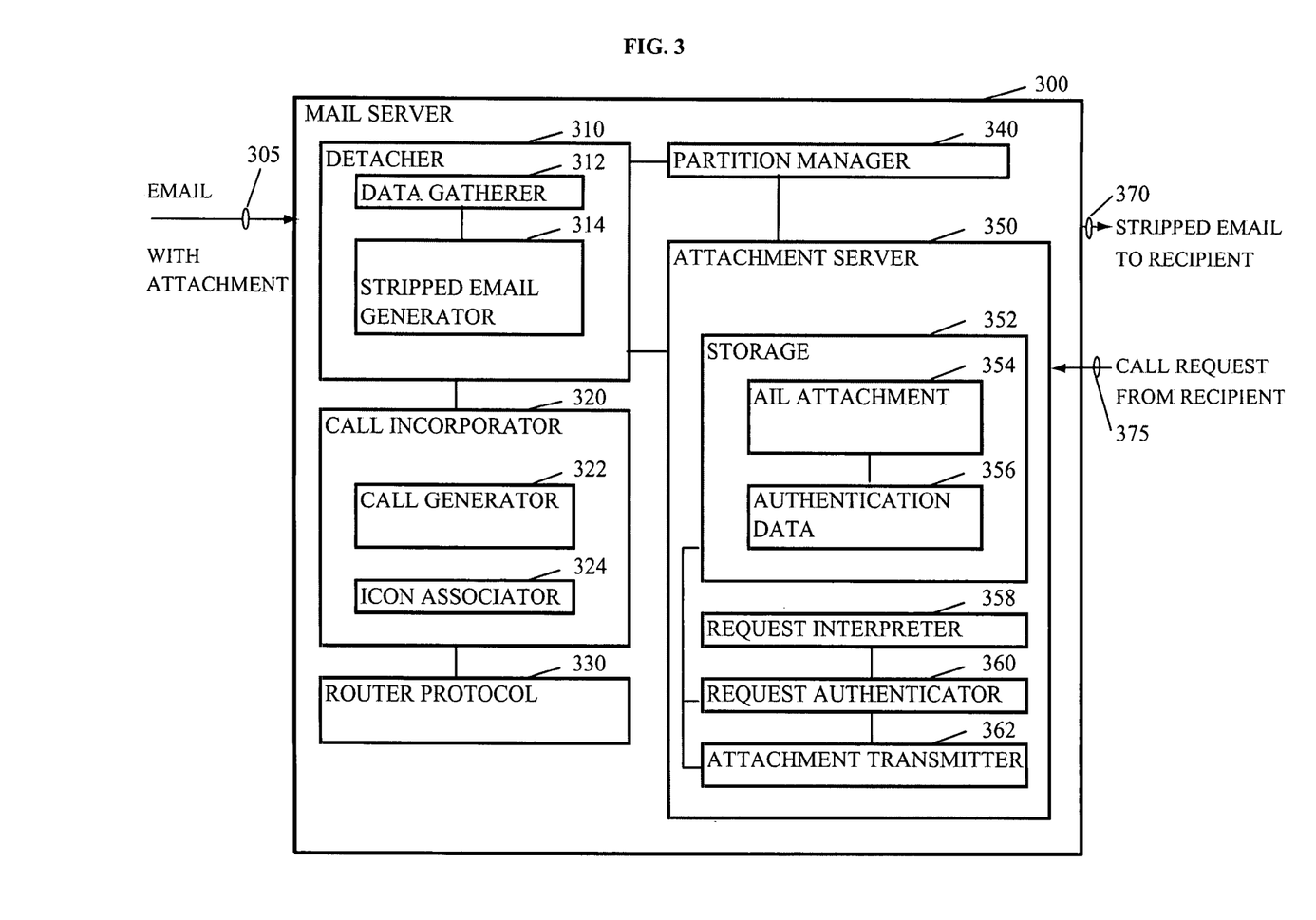
FIG. 3 depicts an example embodiment of a mail server for replacing an email attachment on an email with a call.

Once the mail server 300 receives email 305, mail server 300 begins processing the email 305. Mail server 300 may include a detacher 310, a call incorporator 320, a router protocol 330, a partition manager 340 and an attachment server 350 to process email 305. Detacher 310 may remove the email attachment 354 from email 305 to render a stripped email 370 such as the email depicted in FIG. 2. Detacher 310 may be a set of user-defined rules, enabled by software, such as data gatherer 312 and a stripped email generator 314 to remove the email attachment 354 from email 305.

Data gatherer 312 may parse the email to determine information, such as authentication data 356, to authenticate a request responsive to activation of the call by recipients of stripped email 370. In particular, data gatherer 312 may locate the email addresses of recipients associated with email 305 and associate the addresses with email attachment 354. Mail server 300 may then compare the email address of a user attempting to download email attachment 354 with the email addresses of the intended recipients for stripped email 370 to determine whether the users are authorized to receive email attachment 354. In some embodiments, data gatherer 312 may receive additional information such as a password and login identification so mail server 300 can prompt users attempting to receive email attachment 354 via a call in stripped email 370 to enter the login identification and password before mail server 300 begins transmitting email attachment 354 to the user.

In an alternate embodiment, the detacher 310 is not local to mail server 300, and, instead, is found on a distant network accessible by, e.g., a modem in communication with the distant network providing Web Services to enable detachment of the email attachment 354 from the email to render stripped email 370.

Call incorporator 320 may add a call to stripped email 370 in the form of a hyperlink such as an icon associated with a hyperlink, hypertext, or code to execute via an email client. Like the detacher 310, call incorporator 320 may be a set of user-defined rules, enabled by software. Call incorporator 320 may include a call generator 322 and an icon associator 324. Call generator 320 may generate a call such as a hyperlink or software code that, when executed by a recipient, will transmit a request 375 to download email attachment 354. More specifically, call generator 322 may generate a call that includes an address such as an IP address that is associated with email attachment 354. In further embodiments, the call may include an indication associated with attachment server 350, and/or authentication data 356.

Icon associator 324 may include or have access to one or more icons that can be incorporated into stripped email 370 as a symbolic representation of the attachment. The user, upon receipt of stripped email 370 may then click on the icon to activate the call. For example, detacher 310 may remove email attachment 354 from email 305 to render stripped email 370 and store email attachment 354 in attachment server 350. Call incorporator 320 may then insert a call in the form of a paperclip icon into stripped email 370 and associate a hyperlink with the paperclip icon. When the recipient receives stripped email 370 and clicks on the paperclip icon, a request 375 is forwarded to attachment server 350 to retrieve email attachment 354. In response, attachment server 354 may transmit email attachment 354 to the recipient.

In an alternate embodiment, call incorporator 320 is not local to mail server 300, and, instead, is found on a distant network accessible by a modem in communication with the distant network providing Web Services to enable the addition of a call to the stripped email 370.

After call incorporator 320 adds a call to stripped email 370, a router protocol 330 formats stripped email 370 to forward to the recipient. Router protocol 330 may, for instance, implement a transport layer protocol to reformat stripped email 370 into packets.

If the storage 352 is local to mail server 300, mail server 300 may further include a partition manager 340 for creating attachment server 350. Partition manager 340 may be a set of user-defined rules, enabled by software, on the mail server 300 to partition the mail server 300 for storing the email attachment 354 in storage 352 located within the attachment server 350. By creating an attachment server 350, and storing the email attachment 354 in storage 352, attachment server 350 can act as a dedicated partition of mail server 300 for processing requests to retrieve email attachments.

Partition manager 340 may, for instance, include software, or code, designed to logically partition resources of mail server 300 such as processing capacity, memory, data storage, and input-output (I/O) devices. In many embodiments, partition manager 340 may be a low level operating system that acts as an interface between higher-level applications like operating systems, and hardware. For example, attachment server 350 may be allocated a percentage of the processing capacity available on mail server 300, a hard drive, and a range of logical memory addresses. These resources may then function substantially independent from the resources allocated to mail server 300, providing a mechanism for responding to requests 375 for email attachment 354.

Attachment server 350 may include storage 352 for storing the email attachment 354 recently stripped from the email 305 as well as authentication data 356, request interpreter 358 to associate the a request 375 for an email attachment with email attachment 354 based upon data embedded in the call, a request authenticator 360 to verify the identity of the recipient requesting email attachment 354, and an attachment transmitter 362 to respond to the request 375 by transmitting email attachment 354 to the recipient. Storage 352, itself, may be, for example, a table or database on a hard drive for indexing email attachments and associating the email attachments with stripped emails forwarded to recipients. Like the detacher 310, storage 352 may be local or remote to the mail server 300. That is, the storage 352 may be a part of a computer system dedicated in a network for being the mail server 300. When attachment server 350 is a logical partition of mail server 300, however, partition manager 340 may allocate storage 352 to attachment server 350. Or, the storage 352 may be at a remote location from the mail server 300, allocated to mail server 300 and/or attachment server 350, and be available for storing email attachment 354.

Before attachment server 350 transmits email attachment 354 to a recipient of stripped email 370 with the call in response to activation of the call, a further aspect of the mail server 300 includes a request authenticator 360 to which the recipient must first respond. The request authenticator 360, enabled by programmed software, appears on the display of the recipient, and contains at least one field for the recipient to complete before the recipient may receive email attachment 354. For instance, the field may require the email recipient to enter a password or other identifying information for security reasons. The request authenticator 360, therefore, acts as a security measure to ensure that the email attachment 354 is viewable only if the sender of the email 305 desires.

In other embodiments, request authenticator 360 may compare data associated with request 375 such as the originating address of request 375 with authentication data 356 to verify that the address associated with origination of request 375 is one of the addresses that received stripped email 370. In such embodiments, email attachment 354 may be transmitted automatically to verified recipients.

Figure 4:
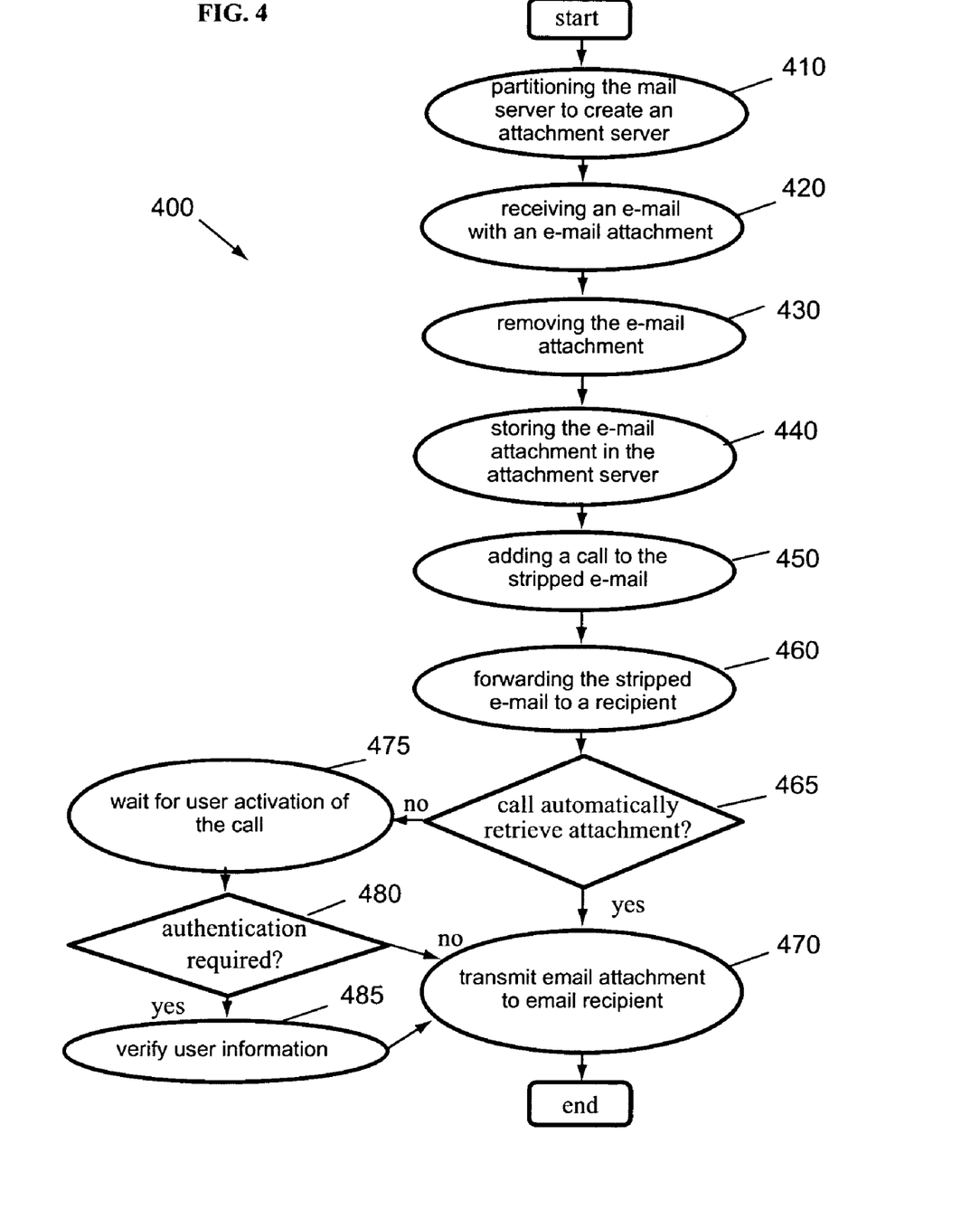
FIG. 4 depicts a flowchart of an embodiment for replacing an email attachment on an email with a call and forwarding the email with the call.

Turning now to FIG. 4, another aspect of the invention is disclosed. Flowchart 400 describes embodiments for replacing an email attachment with a call. Flowchart 400 may be implemented in a device such as mail server 300 shown in FIG. 3, wherein mail server 300 receives an email with an email attachment, the email attachment is stripped from the email and stored, and a call is added to the stripped email before forwarding the stripped email to an intended recipient for optional calling of the stored email attachment.

In some of these embodiments, the flowchart 400 may begin with partitioning 410 of the mail server for creation of an attachment server. As such, the attachment server serves as the device for storing email attachments and services requests to download an email attachment stored in or accessible to the attachment server. Partitioning 410 is advantageous since the partition manager for the mail server can re-allocate resources to the attachment server when demands on processing capacity for the attachment server are high and re-allocate resources from the attachment server when the attachment server is utilizing little or no processing capacity. For instance, an attachment server for an organization see the majority of traffic during the day while employees are at work, passing drawings and electronic documents amongst each other. In response, the partition manager may allocate additional processing capacity from the mail server to the attachment server during the day to handle the added email attachment traffic.

On the other hand, at night, the mail server may be receiving email or other communications from vendors or clients in different time zones and the attachment server may remain substantially idle since no or few employees are at work. In response, the partition manager may re-allocate resources from the attachment server to the mail server.

When the mail server is part of the email sender's network, partitioning 410 of the mail server makes sense for adding organization to the company's computer system(s) acting as the mail server by storing of any or all email attachment. Access to the mail server can then be regulated to allow later retrieval of data, such as the stored email attachment, from the attachment server without compromising infiltration security concerns possible by allowing access to the entire mail server. By providing this added organization to the mail server, an added benefit is a limitation of exposure of unintended data retrieval that may occur by general access to a mail server.

Regardless of whether the attachment server is a logical partition of the mail server or a physically separate computer system, the mail server is designed to receive 420 an email that includes an email attachment. For instance, a user may compose a text message for an email with a computer system having I/O devices, such as a keyboard and mouse, and add an email attachment via an email client. Upon engaging or clicking on a GUI "send" button on the email client, the user forwards the email with the email attachment to the intended recipient via the mail server, which may or may not be part of the email sender's local network.

The mail server then removes 430 the email attachment from the email to produce a stripped email. Removing 430 the email attachment from the email occurs by user-defined rules, enabled by software, found on the mail server. If the mail server is not equipped with such software because, for example, then mail server may implement a software function available from a remote computer system such as Web Services.

After removing 430 the email attachment from the email, the mail server may store the email attachment in storage located within or accessible to the attachment server. That is, for example, if the mail server is local to the email sender's computer system, then part of the mail server's computer system may include storage space allocated for storing 440 the email attachment. As an alternative example, when the mail server is not local to the sender's computer system, or if the mail server's computer system contains insufficient storage space due to storage demands of other applications running on the mail server, then the mail server may call upon Web Services for storing 440 of the email attachment by a service provider.

After storing 440 the email attachment, a call is added 450 to the resultant, stripped email. The call, itself, provides instructions for retrieval of the email attachment when the intended email recipient activates the call. For instance, the call may contain programmed instructions to retrieve the email attachment from the attachment server, wherever the email attachment is actually stored, and to send the email attachment to the intended email recipient now calling for display of the email attachment.

The mail server may then forward 460 the stripped email with the call to the intended email recipient. In several embodiments, the call may include a hyperlink and the email attachment is not automatically retrieved 465. The user must affirmatively activate the call to retrieve the email attachment, advantageously allowing the user to determine when transmission of the email attachment is a necessary burden for the network. The email recipient views the stripped email, sees an hypertext or iconic hyperlink (e.g., a clickable GUI) for the email attachment and decides whether or not to retrieve the email attachment for display is desired. Once the user decides to activate 475 the hyperlink, if no further user identification is required 480 from the user, the attachment server may transmit 470 the email attachment to the recipient. For example, the mail server, upon detaching the email attachment from the email, may parse the email header to determine email addresses associated with recipients of the email. A request for the email attachment can then be verified 485 by comparing the originating email address of a request, or call, for the email attachment with the email addresses from the email header.

On the other hand, the sender of the email may include other identification information that is required for retrieving the attachment and the attachment server may verify 485 the additional user information by prompting the user for the information upon receipt of a request for the email attachment. For example, the user may click the hyperlink in a stripped email. The hyperlink may activate a web browser on the user's computer and direct the web browser to an IP address associated with the attachment server. The attachment server may then request a login identification such as the email address of the recipient and password from the user. The email address may associate the user with the email attachment(s) associated with a call forwarded to the email address, while the password may verify that the user is authorized to access the email attachment. Upon verifying 485 the user information, the email attachment may be transmitted 470 to the user via a download function incorporated into the web browser.

In some embodiments, the intended email recipient's email client may be configurable for retrieving 465 the stored email attachment automatically. For automatic retrieval, the email client may include a menu option, preference, macro, or rule, enabled by software, which automatically executes the call upon downloading or viewing the stripped email with the call. Although email attachments that are automatically downloaded to recipients, such arrangements offer the advantage of time-shifting transmission of the email attachment to different recipients. More specifically, when a recipient is unavailable to download the email attachment such as when the user associated with the recipient's email address is on vacation or otherwise unable or unwilling to view the stripped email, the email attachment is transmitted once to the mail server by the sender and remains on the mail server. Other recipients may also retrieve the email attachment but at different times, reducing the potential peak network traffic caused by transmitting the email attachment to all of the recipients substantially simultaneously.

Once the email attachment is downloaded, the email attachment may also require the user to be verified. Security measures included within the email attachment may require the user to supply information before displaying the email attachment. Requiring information may include prompting the email recipient to enter identifying personal information, a password, or other security information in order to ensure that the email recipient is entitled to view the stored email attachment.

Another embodiment of the invention is implemented as a program product for use with a computer system such as, for example, the system 100 shown in FIG. 1. The program(s) of the program product defines functions of the embodiments (including the methods described herein) and can be contained on a variety of data-bearing media. Illustrative data-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for replacing an email attachment associated with an email with a call to code, wherein the code downloads the email attachment upon activation of the call by a recipient of a stripped email, the method comprising:

removing the email attachment from the email, and producing the stripped email;

storing the email attachment;

adding the call to the stripped email, wherein adding the call comprises adding code to the email, the code being configured to automatically execute upon display of the email via an email client associated with the recipient, to request transmission of the email attachment;

generating the call to the code, wherein the code downloads the email attachment upon activation of the call by the recipient of the stripped email, wherein the code responds to user-defined rules configured for instructing an identity and a location of the email attachment for the recipient, wherein the identity and the location may differ for other recipients; and forwarding the stripped email with the call to the recipient.

2. The method of claim 1, further comprising:

receiving a request for transmission of the email attachment in response to activation of the call; and transmitting the email attachment to the recipient in response to the request.

3. The method of claim 2, further comprising authenticating the request prior to transmission of the email attachment.

4. The method of claim 1, further comprising partitioning a mail server to create an attachment server.

5. The method of claim 1, wherein storing comprises storing the email attachment in storage associated with an attachment server, the attachment server being configured to transmit the email attachment in response to activation of the call by the recipient.

6. The method of claim 1, wherein a hyperlink, upon activation, initiates access to an Internet protocol address associated with the code for the retrieval of the email attachment.

7. A method for replacing an email attachment associated with an email with a call to code, wherein the code downloads the email attachment upon activation of the call by a recipient of a stripped email, the method comprising:

removing the email attachment from the email, and producing the stripped email;

storing the email attachment;

adding the call to the stripped email, wherein adding the call comprises adding a hyperlink to the stripped email, wherein the hyperlink is configured to initiate code associated with the email attachment to transmit the email attachment to the recipient;

generating the call to the code, wherein the code downloads the email attachment upon activation of the call by the recipient of the stripped email, wherein the code responds to user-defined rules configured for instructing an identity and a location of the email attachment for the recipient, wherein the identity and the location may differ for other recipients; and forwarding the stripped email with the call to the recipient.

* * * * *